April 23, 1935.  W. G. G. GODRON  1,999,094
SEALING DEVICE, PACKING AND THE LIKE
Filed Oct. 31, 1933
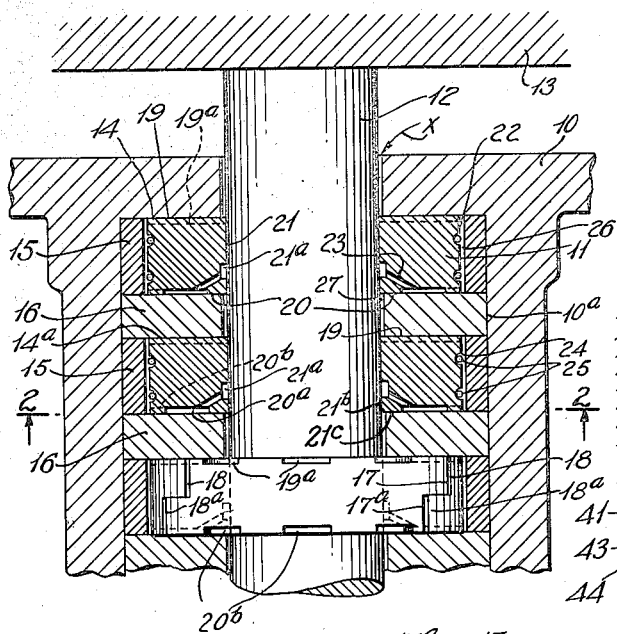
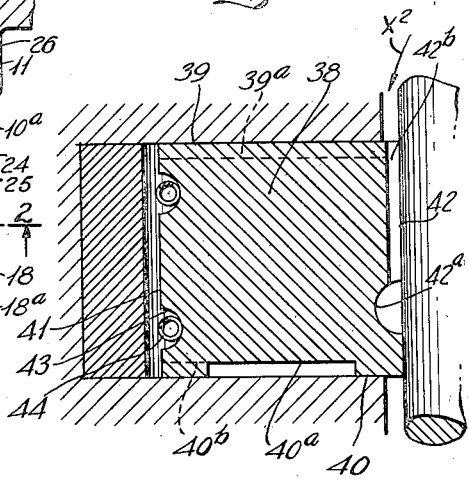
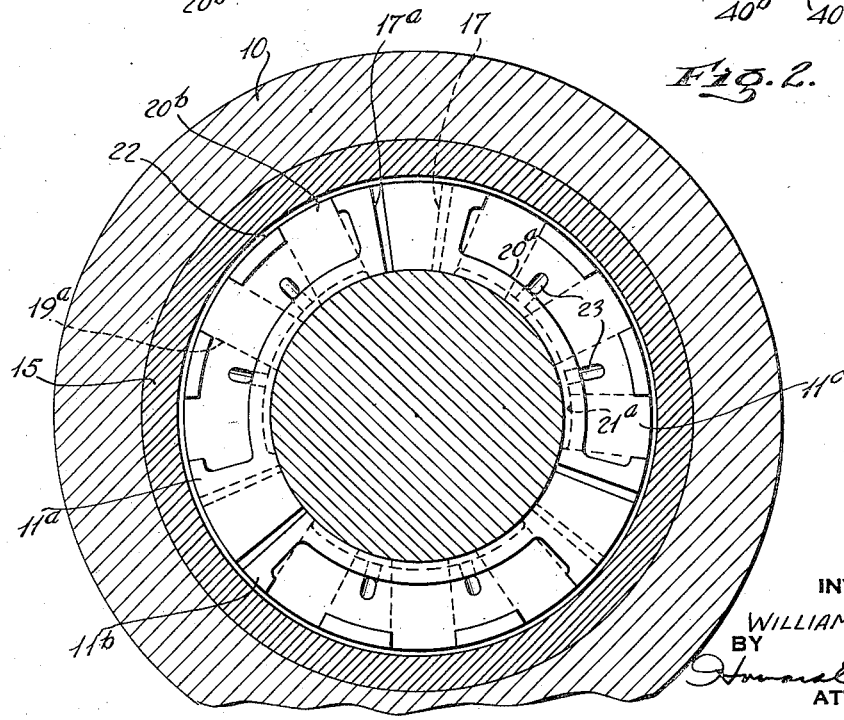
INVENTOR
WILLIAM G.G. GODRON.
BY
ATTORNEY.

Patented Apr. 23, 1935

1,999,094

UNITED STATES PATENT OFFICE 1,999,094

SEALING DEVICE, PACKING AND THE LIKE

William G. G. Godron, New York, N. Y.

Application October 31, 1933, Serial No. 695,972

8 Claims. (Cl. 286—24)

This invention relates to sealing devices including rings, packings, glands or the like; and the object of the invention is to provide devices of the class described, with means for exposing predetermined surfaces thereof to the prevailing pressure to which at least one side surface of the device is directly exposed so as to materially reduce the frictional engagement of the device with respect to its supporting walls and at the same time provide an efficient and effective seal or packing; a further object being to provide a sealing device of the class described composed of separate sections or parts having overlapped or interlocked joints at their intersecting ends to produce an annular ring or packing; a further object being to provide a sealing device, the surfaces of which are grooved or recessed in such manner that the prevailing pressure may be extended from one side surface to an opposed side surface and to the inner or back surface to provide a substantially balanced mounting of the device within its bordering walls and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a transverse, sectional view through a number of sealing devices which I employ indicating one method of their use.

Fig. 2 is a partial section on the line 2—2 of Fig. 1; and,

Fig. 3 is a view similar to Fig. 1 and showing only a part of the construction and showing a modification.

In the drawing, I have indicated for the purpose of illustrating one use of my invention a supporting body 10 for my improved sealing devices 11, and at 12 a rod, tube, cylinder or the like of another body 13, it being understood that the part 12 may be moved longitudinally or axially with respect to the body 10 or said body 10 longitudinally with respect to the part 12, depending entirely upon the structure of the parts and the use thereof.

The body 10 in the construction shown has a recess 10a which is subdivided into a plurality of grooves 14, 14a by distance pieces or rings 15 and spacing or partition rings 16. The sealing devices, glands rings or the like 11 are of similar construction—therefore, the brief description of one will apply to all. In this connection, it will be understood that the devices 11 which will for the purpose of this description be termed rings, may be of any conventional type, but in the construction shown and especially as indicated in Fig. 2 of the drawing, the ring is composed of separate parts 11a, 11b and 11c, and as each part is of similar construction, the brief description of one part will apply to all.

Each of the ring parts 11a, 11b and 11c has at one end a projecting tongue 17 fitting in a corresponding recess 18 in the adjacent end of an opposed part, and below the tongue 17 is a recess 17a receiving the tongue 18a on the adjacent end of an opposed part, thus providing an overlapped seal or joint between the several ring parts 11a, 11b and 11c, as indicated in Fig. 1 of the drawing.

Each part has side surfaces 19 and 20, one surface being preferably exposed to a prevailing pressure, for example, the outer side surface 19 and the other or inner side surface 20 being urged by such pressure against the adjacent side surface of the groove 14, 14a in which the device is mounted. At 21, I have shown the inner or back surface of the device which might also be better termed the working surface of the device and at 22 the outer surface thereof. The side surface 19 of each ring part is provided with radial grooves 19a opening outwardly through the surfaces 21 and 22, whereas the surface 20 is provided with the circumferentially extending groove 20a and radial passages 20b, the latter opening outwardly through the surface 22. The surface 21 is provided adjacent the surface 20 with a circumferential groove 21a, and radial ports or passages 23 place the grooves 20a and 21a in communication with each other. This construction provides two annular bearing surfaces 21b and 20c to affect a seal of the device in connection with adjacent walls of the grooves 14, 14a and the part 12. The surfaces 22 are also provided with spaced circumferential grooves 24 to receive rings 25 for supporting the sections 11a, 11b and 11c against displacement, especially in the operation of assembling them in connection with the supports.

In the operation of the device, the prevailing pressure passes between the body part 10 and part 12 as indicated by the arrow x, Fig. 1, and acts upon the surface 19 to urge the opposed surface 20 into engagement with the adjacent supporting wall of the groove 14, and this pressure is permitted to enter the space 26 between the surface 22 and the distance ring 15 to pass over the surface 22 and enter the groove 20a through the radial grooves 20b, thus balancing the pressure on the surface 20, and this pressure extends also to the groove 21a in the surface 21 through the radial ports or passages 23 to relieve the pressure and frictional engagement of the surface 21 on the part 12.

In a multiple unit which is partly illustrated in Fig. 1 of the drawing, the pressure which will pass the ring 11 in the groove 14 will extend to the ring of the adjacent groove 14a through the passage 27, and while this pressure is lower than the initial pressure entering as at x, it will nevertheless act upon the ring in the groove 14a in the same proportions and with the same results as with the first ring, it being understood at this time that any number of rings or glands may be provided so as to affect a substantial seal of the body 10 with respect to the part 12, and vice versa.

In Fig. 3 of the drawing, I have shown a slight modification wherein the sealing device or ring 38 which may be of the general structure of the device shown in Figs. 1 and 2 of the drawing is provided on the side surface 39 thereof with radial grooves 39a on the surface 40 thereof with a circumferentially extending groove 40a and with radial grooves 40b opening outwardly through the surface 41 similar to the surface 22, and the surface 42 similar to the surface 21 is provided with a circumferentially extending groove 42a similar to the groove 21a, and the latter instead of being placed in communication with the groove 40a by ports similar to the ports 23, is placed in communication with the surface 39 through transverse grooves 42b. With this construction, the pressure entering as at $x^2$ will, in addition to passing to the groove 40a of the surface 40 also extend to the groove 42a directly through the grooves 42b. The surface 41 also includes circumferential grooves 43 in which are spring rings or bands 44 for supporting a number of ring sections in assembled relation as with the structures shown in Figs. 1 and 2.

As above stated, however, it will be apparent that the principle of ring or packing design including the grooves and passages may be incorporated in rings of different styles and types, and not restricted to the particular style and type herein shown and described. It will also be apparent that various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. A ring of the class described consisting of a plurality of circumferential sections having overlapped adjacent ends, each ring section having side surfaces and outer and inner surfaces, one of the latter constituting a working surface movable with respect to a body to affect a seal between the ring and said body, one side surface of the ring sections being exposed to a pressure urging the ring in the direction of the other side surface, means at the first named side surface providing communication between the outer and inner surfaces of said ring sections, the second named side surface of each ring section having a circumferentially extending recess, and means involving passages extending from said circumferential recess to the outer surface of the ring for providing communication between said circumferential recess and the communicating means of the first mentioned side surface of each ring section whereby the pressure at opposed side surfaces of the ring sections is substantially balanced when said sections are mounted within their support.

2. A ring of the class described consisting of a plurality of circumferential sections having overlapped adjacent ends, each ring section having side surfaces and outer and inner surfaces, one of the latter constituting a working surface movable with respect to a body to affect a seal between the ring and said body, one side surface of the ring sections being exposed to a pressure urging the ring in the direction of the other side surface, means at the first named side surface providing communication between the outer and inner surfaces of said ring sections, the second named side surface of each ring section having a circumferentially extending recess, means involving passages extending from said circumferential recess to the outer surface of the ring for providing communication between said circumferential recess and the communicating means of the first mentioned side surface of each ring section whereby the pressure at opposed side surfaces of the ring sections is substantially balanced when said sections are mounted within their support, and the working surface of each ring section having a circumferentially extending groove, and means providing communication between said groove and the prevailing pressure at the first named side surface of the ring section.

3. A packing ring for reciprocating members, said ring having outer, inner and side surfaces, one side surface having radial grooves spaced circumferentially thereof and opening through outer and inner surfaces to permit a prevailing pressure to pass over said side surface to the outer surface of the ring, the opposite side surface having a circumferentially arranged recess disposed intermediate said inner and outer surfaces, means providing communication between said recess and said first named grooves, the inner surface of the ring having a circumferentially arranged groove, and means providing communication between said last named groove and the prevailing pressure whereby said ring is substantially balanced within said reciprocating member and the wall engaged by said ring.

4. A packing ring for reciprocating members, said ring having outer, inner and side surfaces, one side surface having radial grooves spaced circumferentially thereof and opening through outer and inner surfaces to permit a prevailing pressure to pass over said side surface to the outer surface of the ring, the opposite side surface having a circumferentially arranged recess disposed intermediate said inner and outer surfaces, means providing communication between said recess and said first named grooves, the inner surface of the ring having a circumferentially arranged groove, means providing communication between said last named groove and the prevailing pressure whereby said ring is substantially balanced within said reciprocating member and the wall engaged by said ring, said ring being composed of circumferential sections, and the circumferential grooves and recesses terminating short of the ends of each section.

5. A packing ring for reciprocating members, said ring having outer, inner and side surfaces, one side surface having radial grooves spaced circumferentially thereof and opening through outer and inner surfaces to permit a prevailing pressure to pass over said side surface to the outer surface of the ring, the opposite side surface having a circumferentially arranged recess disposed intermediate said inner and outer surfaces, means providing communication between said recess and said first named grooves, the inner surface of the ring having a circumferentially arranged groove, means providing communication between said last named groove and the prevailing pressure whereby said ring is substantially balanced within said reciprocating member and the wall engaged by said ring, and said first named means comprising circumferentially spaced passages extending from said recess and opening through the outer surface of the ring.

6. A packing ring for bodies having a ring receiving groove, said ring comprising inner and outer, upper and lower surfaces, said upper surface being exposed to a pressure which normally urges the lower surface into contact with an adjacent wall of said groove, said lower side surface being provided with a circumferentially extending recess arranged intermediate inner and outer surfaces and also including a plurality of radial passages providing communication between said recess and the outer surface of the ring, means comprising radial passages opening through the inner and outer surfaces of the ring providing communication between the prevailing pressure at the upper surface of the ring and said passages and recess whereby excessive friction between the lower surface of the ring and the adjacent wall of the ring groove is substantially eliminated.

7. A packing ring for bodies having a ring receiving groove, said ring comprising inner and outer, upper and lower surfaces, said upper surface being exposed to a pressure which normally urges the lower surface into contact with an adjacent wall of said groove said lower side surface being provided with a circumferentially extending recess arranged intermediate inner and outer surfaces and also including a plurality of radial passages providing communication between said recess and the outer surface of the ring, means comprising radial passages opening through the inner and outer surfaces of the ring providing communication between the prevailing pressure at the upper surface of the ring and said passages and recess whereby excessive friction between the lower surface of the ring and the adjacent wall of the ring groove is substantially eliminated, the inner surface of the ring having a circumferentially extending groove, and means providing communication between said groove and the prevailing pressure, thereby reducing frictional engagement of said inner surface upon the member to be engaged thereby.

8. In a body arranged upon a shaft, the body having spaced ring grooves having a bore for receiving a shaft, means comprising a series of packing rings for sealing the body upon the shaft, said body having spaced ring grooves opening through the bore thereof and arranged longitiudinally of the shaft, rings mounted in said grooves, each of said rings having inner and outer, upper and lower surfaces, said upper surface being exposed to a pressure which normally urges the lower surface into contact with an adjacent wall of the groove in which the ring is mounted, said lower side surface being provided with a circumferentially extending recess arranged intermediate inner and outer surfaces and also including a plurality of radial passages providing communication between said recess and the outer surface of the ring, the upper surface of the ring having radial passages through the inner and outer surfaces thereof whereby the prevailing pressure at the outer surface of the ring may extend to the recess on the lower surface thereof to substantially eliminate excessive friction between the lower surface of the ring and the adjacent wall of the ring groove, the inner surface of the ring having a circumferentially extending groove, and means providing communication between said groove and the prevailing pressure, thereby reducing frictional engagement of said inner surface upon said shaft, and each of the rings being composed of separate sections having overlapping adjacent ends.

WILLIAM G. G. GODRON.